US 8,856,382 B2

(12) United States Patent
Akolkar et al.

(10) Patent No.: US 8,856,382 B2
(45) Date of Patent: Oct. 7, 2014

(54) ON-BOARDING SERVICES TO A CLOUD ENVIRONMENT

(75) Inventors: Rahul P. Akolkar, Tukahoe, NY (US); Paula K. Austel, Cortlandt Manor, NY (US); Thomas A. Mikalsen, Cold Spring, NY (US); Isabelle M. Rouvellou, New York, NY (US); Alla Segal, Mount Kisco, NY (US); Hidayatullah H. Shaikh, Shrub Oak, NY (US); Ignacio Silva-Lepe, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/561,432

(22) Filed: Jul. 30, 2012

(65) Prior Publication Data

US 2014/0032764 A1 Jan. 30, 2014

(51) Int. Cl.
*G06F 15/173* (2006.01)
(52) U.S. Cl.
USPC ........... 709/239; 709/203; 709/225; 709/226; 709/204; 715/740; 713/151; 713/164; 713/168; 713/182
(58) Field of Classification Search
CPC .................................................... G06F 15/173
USPC .......................... 709/224–227, 239, 203, 204
See application file for complete search history.

(56) References Cited

U.S. PATENT DOCUMENTS

| | | | |
|---|---|---|---|
| 2009/0049422 A1* | 2/2009 | Hage et al. | 717/104 |
| 2011/0126275 A1 | 5/2011 | Anderson et al. | |
| 2011/0161952 A1 | 6/2011 | Poddar et al. | |
| 2011/0296021 A1 | 12/2011 | Dorai et al. | |
| 2011/0321033 A1 | 12/2011 | Kelkar et al. | |
| 2012/0011077 A1 | 1/2012 | Bhagat | |
| 2012/0158821 A1* | 6/2012 | Barros | 709/203 |

OTHER PUBLICATIONS

A.V. Konstantinou et al., "An Architecture for Virtual Solution Composition and Deployment in Infrastructure Clouds," ACM Workshop on Virtualization Technologies in Distributed Computing (VTDC), Jun. 2009, pp. 9-17, Barcelona, Spain.
X.J. Collazo-Mojica et al., "Virtual Environments: Easy Modeling of Interdependent Virtual Appliances in the Cloud," pire.fiu.edu/publications/mojica_flexitools_splast20102.pdf, Oct. 2010, 19 pages.
T.C. Chieu et al., "A Cloud Provisioning System for Deploying Complex Application Services," IEEE 7th International Conference on E-Business Engineering (ICEBE), Nov. 2010, pp. 125-131.

(Continued)

*Primary Examiner* — Jude Jean Gilles
(74) *Attorney, Agent, or Firm* — Louis J. Percello; Ryan, Mason & Lewis, LLP (57) ABSTRACT

A system in a cloud services environment comprises one or more service offerings, one or more service instances and one or more service support utilities. Each of the one or more service offerings is described by at least one service descriptor. Each of the one or more service instances is obtained from at least one of the one or more service offerings. Each of the one or more service support utilities is customized by at least one service descriptor. A service comprises at least one component and a service descriptor comprises one or more models.

17 Claims, 5 Drawing Sheets

(56) References Cited

OTHER PUBLICATIONS

A.V. Dastjerdi et al., "QoS-Aware Deployment of Network of Virtual Appliances Across Multiple Clouds," IEEE 3rd International Conference on Coud (sic) Computing Technology and Science (CloudCom), Nov.-Dec. 2011, pp. 415-423, Athens, Greece.

R. Mietzner et al., "Cafe: A Generic Configurable Customizable Composite Cloud Application Framework," On the Move to Meaningful Internet Systems (OTM), Confederated International Conferences, CoopIS, DOA, IS, and ODBASE, LNCS 5870, Part 1, Nov. 2009, pp. 357-364, Vilamoura, Portugal.

R. Mietzner et al., "A Self-Service Portal for Service-Based Applications," IEEE International Conference on Service-Oriented Computing and Applications (SOCA), Dec. 2010, 8 pages, Perth, Australia.

T.C. Chieu et al., "Solution-Based Deployment of Complex Application Services on a Cloud," IEEE International Conference on Service Operations and Logistics and Informatics (SOLI), Jul. 2010, pp. 282-287.

Y. Demchenko et al., "Generic Architecture for Cloud Infrastructure as a Service (IaaS) Provisioning Model, Release 1" System and Network Engineering (SNE), SNE Technical Report SNE-UVA-2011-03, Apr. 2011, pp. 1-27.

X. J. Collazo-Mojica et al., "Virtual Environments: Easy Modeling of Interdependent Virtual Appliances in the Cloud," Florida International University, Aug. 2010, 4 pages.

\* cited by examiner

ON-BOARDING SERVICES TO A CLOUD ENVIRONMENT

FIELD

The field of the invention relates to application services and, more particularly, to techniques and systems for on-boarding application services to a cloud environment.

BACKGROUND

Cloud computing services allow for convenient, on-demand network access to a shared pool of configurable computing resources (e.g., networks, servers, storage, applications, services, etc.) that can be rapidly provisioned and released. A given cloud may provide a variety of resources, such as Infrastructure as a Service (IaaS), Platform as a Service (PaaS) and Software as a Service (SaaS). Cloud computing is often used in conjunction with virtualized resources. Virtualization of a resource typically refers to an arrangement in which logical resources are abstracted from physical resources.

Cloud computing has the potential to overhaul the manner in which IT services and business are offered and conducted, providing significant cost savings and additional capabilities such as flexibility for users.

SUMMARY

Embodiments of the invention provide techniques for on-boarding application services to a cloud environment.

For example, in one embodiment, a system in a cloud services environment comprises one or more service offerings, one or more service instances and one or more service support utilities. Each of the one or more service offerings is described by at least one service descriptor. Each of the one or more service instances is obtained from at least one of the one or more service offerings. Each of the one or more service support utilities is customized by at least one service descriptor. A service comprises at least one component and a service descriptor comprises one or more models.

Further embodiments of the invention comprise one or more of the following features.

Each of the one or more models of the service descriptor comprises at least one of an information model that provides identifying information for at least one described service, a structural model that describes one or more components of at least one described service, an operational model that describes a procedure for obtaining at least one service instance of at least one described service, a data model that conveys data items between at least one service offering and at least one service instance of at least one described service, an interaction model that describes a front end user experience at one or more stages in a lifecycle of at least one service instance, a service-level agreement model that allows specification of at least one service quality guarantee agreed to by at least one service offering, a licensing model, a security model, a billing model and a cloud concerns model.

The procedure given by the operational model comprises one of creating a service instance of the described service, becoming an additional tenant on an existing multi-tenant service instance, and connecting to a singleton service instance.

The service-level agreement model includes at least one of a custom defined service quality level and a well-known service quality level.

A given service is one of a cloud service, infrastructure as a service, platform as a service and software as a service.

The one or more service offerings are provided by two or more independent software vendors.

Advantageously, one or more embodiments of the invention allow for an improved system for on-boarding and managing application services to a cloud environment.

These and other embodiments of the invention will become apparent from the following detailed description of illustrative embodiments thereof, which is to be read in connection with the accompanying drawings.

DETAILED DESCRIPTION

Illustrative embodiments of the invention may be described herein in the context of an illustrative method or device or article etc. However, it is to be understood that embodiments of the invention are not limited to the illustrative devices, articles or methods described but are more broadly applicable to other suitable methods, devices and articles.

Currently, providers of cloud services must set up an independent platform to allow end-users to access services offered on a given cloud. Thus, users are required to navigate several different user interfaces to obtain cloud services from different vendors. In addition, the cost of setting up and maintaining a cloud can also be prohibitively expensive for some independent software vendors (ISVs). ISVs may also have difficulty in on-boarding cloud services to an existing cloud because of complex and individualized configuration requirements for a given cloud. Thus, there exists a need to open up clouds to providers and end-users such that service providers are able to offer their cloud services on a level playing field and such that end-users are able to obtain and manage existing cloud services from a central user interface.

Figure 1:
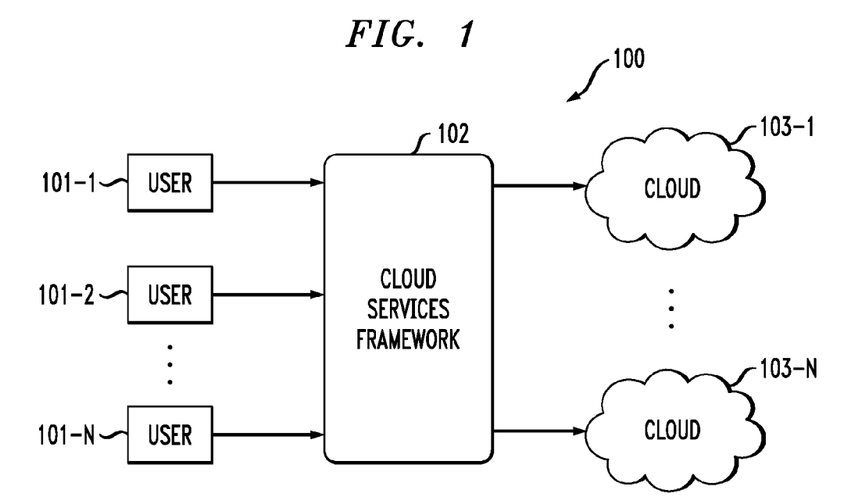
FIG. 1 illustrates a cloud computing system, according to an embodiment of the invention.

FIG. 1 illustrates an example of a system 100 for managing cloud services. The system 100 allows for a set of users 101-1 to 101-N to access cloud services offered on multiple clouds 103-1 to 103-N through a single cloud services framework interface 102. A given user 101-1 could be an end-user of the cloud services, a cloud services provider such as an ISV, an owner of a given cloud 103-1, etc. A given user 101-1 can also be both an end-user and a provider of cloud services. The cloud services framework 102 allows multiple users to manage cloud service offerings using a single user interface, rather than accessing each cloud 103-1 to 103-N using a separate interface.

It is important to note that while FIG. 1 illustrates a system 100 where there are multiple clouds, in some embodiments cloud services framework 102 may manage only a single cloud. In addition, while users 101-1 to 101-N are shown with a single connection to cloud services framework 102, in other embodiments a given user 101-1 may have a separate connection or interface with cloud services framework 102 based on whether the given user 101-1 is an end-user or a provider of cloud services. It is also important to note that while embodiments of the invention may be described with reference to the Cloud Services Framework (CSF) for the IBM SmartCloud Enterprise, embodiments of the invention are not limited to use solely with the IBM SmartCloud Enterprise but is instead more generally applicable to other cloud environments and software.

A simple and effective service provider experience is essential to ensure a vibrant ecosystem where ISVs and other service providers may make their cloud-based service offerings available. A good service provider experience, therefore, depends on the set of support services provided by a cloud and the ease of on-boarding service offerings onto the cloud. Embodiments of the invention allow services providers to holistically describe a service offering as an aggregation of well-defined models, each addressing a support service or cloud concern, and further enabling the ease of on-boarding by accepting the resulting standard description format for service registration.

Embodiments of the invention provide an extensible framework which makes it easier for service providers to integrate their services on a cloud environment as well as to leverage basic functionality of the cloud environment such as metering, billing and front end user experience. The term "service offering" as used herein refers to one or more cloud, SaaS, PaaS and IaaS offerings for a cloud that may involve various infrastructure, middleware or third-party components. The term "service instance" as used herein refers to an instance of a service offering. The term "service descriptor" as used herein refers to a generic description of part of or a whole service offering.

Figure 2:
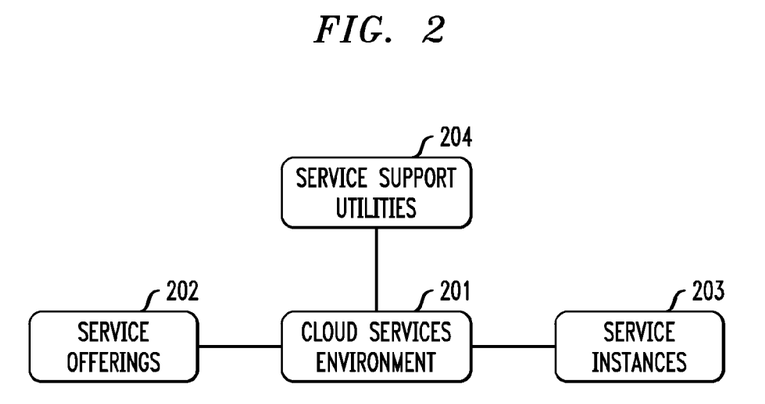
FIG. 2 illustrates a cloud services environment, according to an embodiment of the invention.

FIG. 2 shows an example of a cloud services environment 201. The cloud services environment 201 contains service offerings 202, services instances 203 and service support utilities 204. Service descriptors (not shown) describe service offerings 202, provide details for instantiating service instances 203, and customize service support utilities 204 for a given service.

Cloud services environment 201 is configured to handle multiple service offerings 202. The services offerings 202 may be offered by different service providers or ISVs in a single cloud services environment 201. Service offerings 202 may be described by one or more service descriptors. A given service offering may be described by multiple service descriptors or by a single service descriptor. Service descriptors may define, for example, resource allocation or service levels for a given service offering. By providing a framework where service offerings can be created using generic service descriptors, an ISV can easily customize various cloud service offerings without the need for expensive set-up and maintenance of cloud hardware.

Cloud services environment 201 is also configured to handle multiple service instances 203. Each service instance is obtained from one or more service offerings via an operational model. An operational model describes a procedure for obtaining at least one service instance of a described service. In addition, cloud services environment 201 can provide various service support utilities 204. A service support utility can be customized by one or more models of a service descriptor. Advantageously, the cloud services environment 201 allows for an ISV to not only on-board cloud services themselves, but also to on-board support utilities for on-boarded cloud services.

Figure 3:
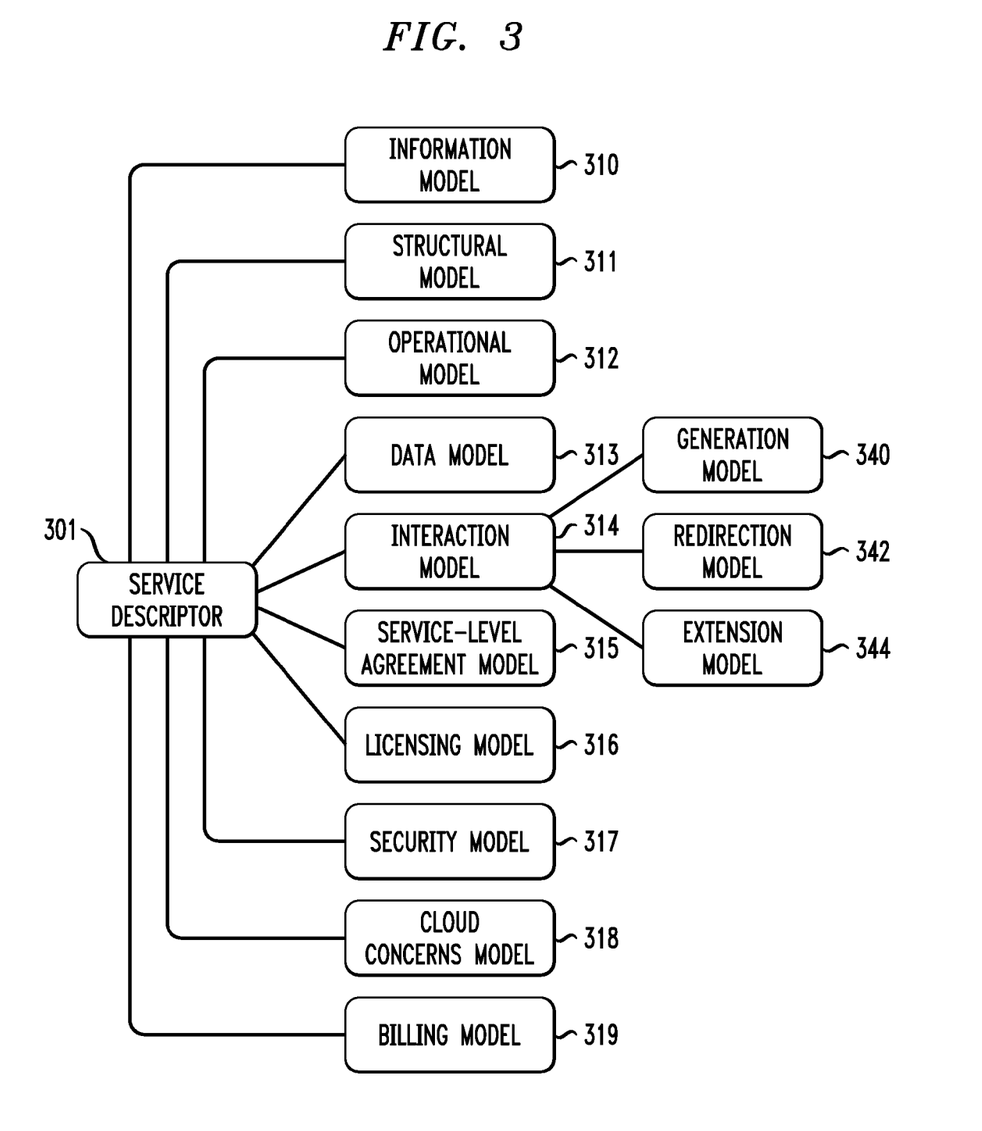
FIG. 3 illustrates a service descriptor, according to an embodiment of the invention.

FIG. 3 shows an example of a service descriptor 301. Each service descriptor 301 may be comprised of one or more models 310-319 which describe components of a given service. While FIG. 3 shows a service descriptor with models 310-319, a service descriptor need not contain all of the models shown in FIG. 3. In addition, a service descriptor may contain additional models which are not shown in FIG. 3.

Service descriptor 301 includes an information model 310. Information model 310 provides identifying information for a service. The identifying information may include a short name, description, graphical icon, service provider name, contact, and service type for a given service offering.

Service descriptor 301 also includes a structural model 311 that describes one or more components of a service. If the service embodies cloud resources such as, for example, instances, keys and storage volumes, those components will be listed in the structural model 311. The individual components described by the structural model 311 can be managed either internally or externally to a given cloud.

As discussed above, an operational model 312 of the service descriptor 301 describes a procedure for obtaining a service instance. A service provider specifies a set of workflows to describe operations that are performed during a service instance lifecycle. Template workflows are available for common operations such as, for example, provisioning. Operational model 312 may specify the procedure for creating a new instance of a described service, for becoming an additional tenant on an existing multi-tenant service, or connecting to an existing singleton service.

Data model 313 of the service descriptor 301 conveys data items between a service offering and a service instance. A service provider can define input parameters, output parameters and other parameters in the data model 313 which are required for a service instance to be created.

Interaction model 314 of the service descriptor 301 describes a front end user experience at various stages in a lifecycle of a service instance. Depending on service provider preference, the interaction model 314 can be realized as one or more of a variety of sub-models. For example, the interaction model 314 may include a generation model 340, wherein the end-user interface is generated from available details in the service descriptor. As another example, the interaction model 314 may include a redirection model 342 wherein the end-user interaction is redirected to an off-cloud user interface. An interaction model 314 may also include an extension model 344, wherein the end-user interaction model 314 is given in terms of extension points for the user interface.

Service-level agreement model 315 of the service descriptor 301 specifies various quality guarantees agreed to by a service offering. The service-level agreement model 315 may include well-known or standard service quality levels, or custom defined service quality levels. A service provider may thus select from a list of standard service quality levels when designing a service offering, or may instead create various custom service quality levels tailored to the service offering. A given service-level agreement model 315 can also include both standard and custom service quality levels.

Licensing model 316 allows the service provider to include an End User License Agreement (EULA) for a service offering. In some embodiments, the EULA may encompass all components of the service offering. In other embodiments a service offering may include separate EULAs for separate components of the service.

Security model 317 allows the service provider to specify various security settings associated with a service offering. Such settings can include access rights, groups, virtual LAN (VLAN) and/or virtual private network (VPN) settings, etc.

Cloud concerns model 318 allows a service provider to specify other cloud related concerns for a service offering. Cloud concerns may include datacenter availability, co-location constraints, and auto-scaling.

Billing model 319 allows a service provider to customize billing arrangements for service offerings. The billing model 319 allows a service provider to set prices, costs, royalties, charge metrics, etc. for service offerings.

In some embodiments, a single service descriptor includes all the necessary models required to describe a service offering. In other embodiments, multiple service descriptors each describing a single or a few models are used to describe a service offering. In addition, one skilled in the art would readily appreciate that the above description of service descriptor models constitutes a non-exhaustive list of possible models. In addition, in some embodiments one or more of the above-described models may be merged into a single model.

Service descriptors may apply only to a single cloud or may apply to multiple clouds. For example, the cloud services environment 201 of FIG. 2 may service offerings 202, service instances 203 and service support utilities 204 for multiple clouds as shown in FIG. 1. Service descriptors may thus describe components of a service which utilizes resources from multiple clouds simultaneously. Service offerings 202 may be a cloud service, IaaS, PaaS or SaaS. The service offerings, as discussed above, may be provided by two or more ISVs.

Figure 4:
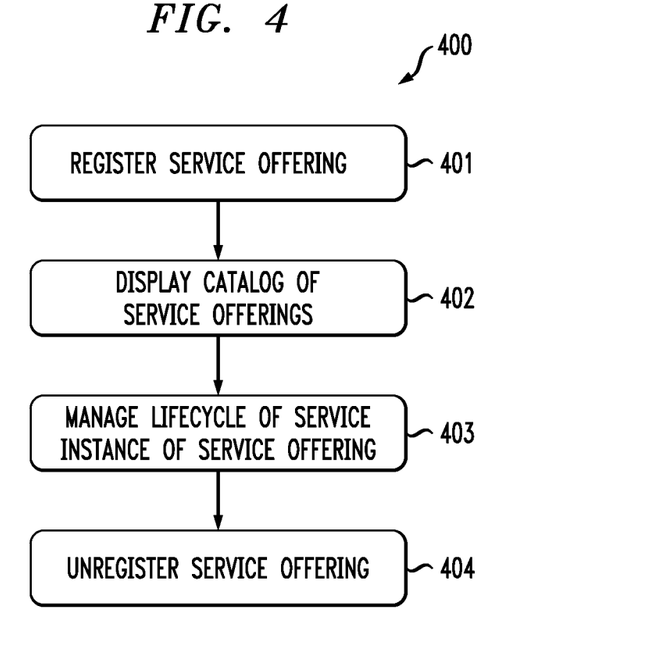
FIG. 4 illustrates of methodology of managing a cloud services environment, according to an embodiment of the invention.

FIG. 4 illustrates a methodology 400 for managing a cloud services environment. In step 401, a service offering is registered for at least one cloud. A cloud services provider may choose to register the service offering on a single cloud or on multiple clouds. In step 402, a catalog of available service offerings is displayed. The service offerings may include offerings registered on multiple clouds or a single cloud. In step 403, the lifecycle of a service instance of a service offering is managed. Managing the lifecycle of a service instance will typically begin with obtaining one or more service instances. Obtaining a service instance may comprise creating a new service instance, adding a new tenant to an existing multi-tenant service instance or connecting to a singleton service instance. Managing the lifecycle also includes reading state information from the one or more service instances. For example, a given service offering may be for a time-based service. The state information may thus include information regarding the amount of time remaining for an instance of a time-based service. When the state information indicates that the time limit has expired for the service instance, the service instance may be discarded. It is important to note that state information is not limited solely to time-based information. For example, a given service offering could also be bandwidth based such that the state information includes information on a remaining bandwidth allotment. One skilled in the art will readily appreciate that numerous other examples are possible, including combinations of state information such as time and bandwidth allotments. Managing the lifecycle of a service will typically conclude with discarding a service instance. Discarding the service instance may comprise destroying the service instance, removing a tenant from the service instance or disconnecting from the service instance.

Finally, in step 404, a service offering is unregistered from a given cloud. A service provider may choose to completely unregister a service offering, or may simply choose to unregister a service offering from one cloud while keeping the service offering registered on a different cloud.

Figure 5:
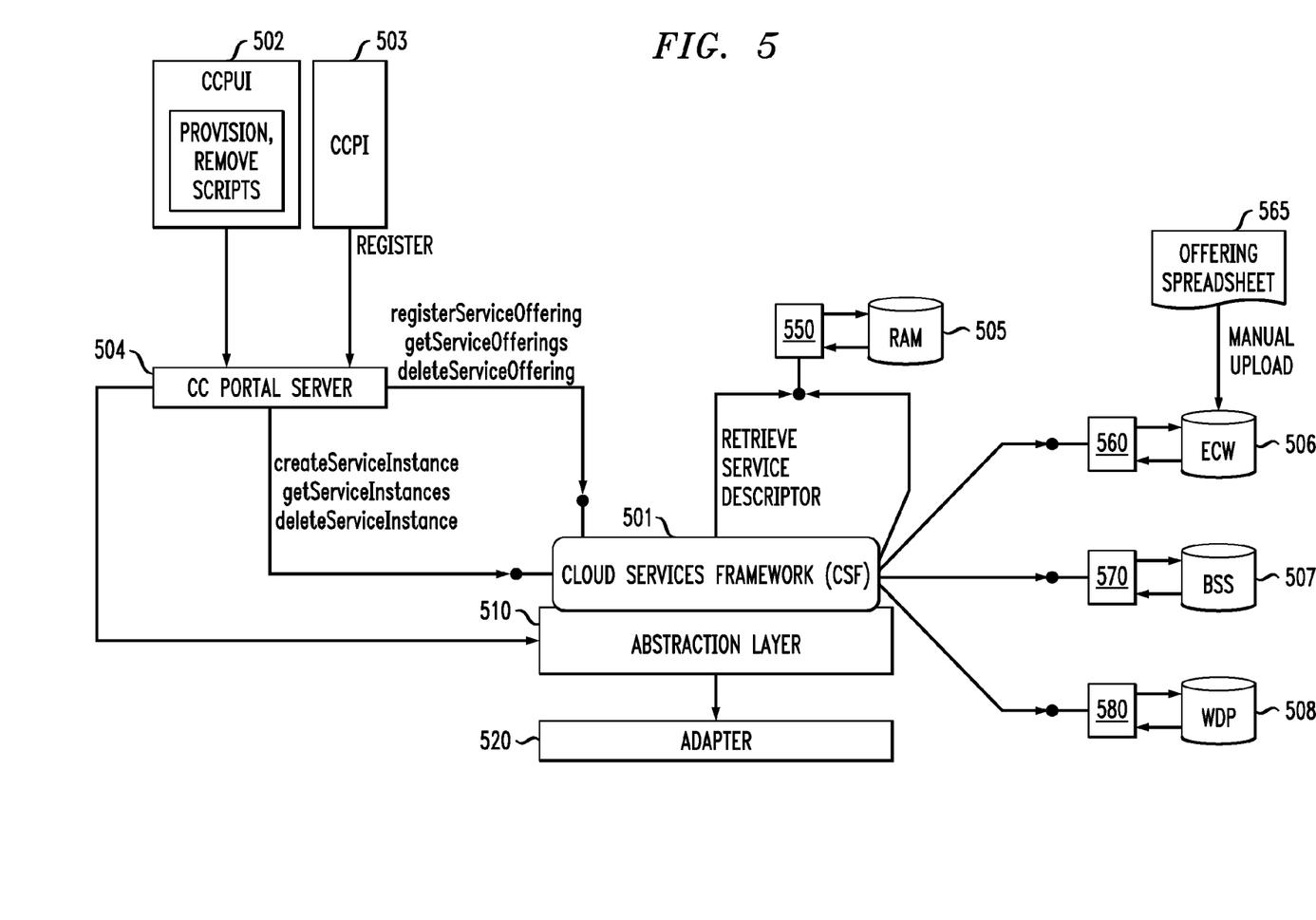
FIG. 5 illustrates an alternate cloud services environment, according to an embodiment of the invention.

FIG. 5 illustrates an example arrangement of CSF 501. A cloud computing (CC) portal server 504 serves as an interface between CC Portal User Interface (CCPUI) 502, CC Provider Interface (CCPI) 503 and CSF 501. CCPUI 502 serves as a gateway between end users and CSF 501. CCPUI 502 allows end users to interact with the CC portal server 504 to manage their cloud service instances. CCPUI 502 also allows end users to provision and remove scripts customizing service instances.

CC portal server 504 receives commands from CCPUI 502 and CCPI 503 and forwards the commands to CSF 501. For instance, in response to an end-user command from CCPUI 502, CC portal server 504 may send commands such as createServiceInstance, getServiceInstances and deleteServiceInstance to CSF 501. The createServiceInstance command is typically sent in response to an end-user signing up for a service offering or modifying one or more characteristics of an existing service offering. The getServiceInstances command can be sent to obtain a list of service instances to which an end-user is currently subscribed. The deleteServiceInstance command is used to destroy a service instance associated with an end user, remove an end user from an existing multi-tenant service instance or disconnect an end user from a service instance.

CCPI 503 provides an interface for cloud service providers to register service offerings onto CSF 501. CC portal server 504 forwards commands such as registerServiceOffering, getServiceOffering and deleteServiceOffering to CSF 501. The command registerServiceOffering is used for adding a service offering to a cloud, the command getServiceOfferings is used for obtaining a catalog of available service offerings and the command deleteServiceOffering is used for removing a service offering from a cloud. It is important to note that while FIG. 5 shows CCPUI 502 and CCPI 503 as separate interfaces for clarity purposes, in some embodiments a single user interface allows end users to manage their service instances and allows for end users who are also service providers to register and manage their service offerings.

FIG. 5 shows CSF 501 coupled with an abstraction layer 510. The abstraction layer 510 is coupled to an adapter 520. CSF 501 may provide services such as SaaS, PaaS and IaaS. For example, service offerings may constitute IaaS, where the service offering provides virtual machines, servers, storage, etc. to an end user. In such an instance, abstraction layer 510 provides the necessary abstraction from CSF 501 to adapter 520 to provide such a service.

CSF 501 is also coupled to several storage devices. For example, CSF 501 retrieves service descriptors from rational asset manager (RAM) 505 via interface 550. Interface 550 may be a processing device, network element, server or other computing device which allows CSF 501 to access RAM 505. It is important to note that while FIG. 5 shows CSF 501 retrieving service descriptors from a RAM such as RAM 505, in other embodiments the service descriptors may be retrieved from other repositories, including devices such as hard disks, network storage, read-only memory (ROM), etc.

An owner of CSF 501 may choose to upload an offering spreadsheet 565 to entitlement data storage such as ECW 506. The offering spreadsheet 565 may be in the form of a database. The offering spreadsheet 565 governs permissions for the CSF 501. For example, the owner or manager of CSF 501 may wish to restrict certain resources to certain providers. As such, when CSF 501 retrieves a service descriptor from RAM 505, the CSF will also look up any entitlements information in ECW 506 to determine whether a given end user or service provider is authorized to create a service instance or register a service offering which requires access to restricted resources. FIG. 5 illustrates an interface 560 which CSF 501 uses to access ECW 506. Interface 560 is similar to interface 550 in that they may comprise a processing device, network element, server or other computing device which allows CSF to retrieve information from ECW 506. Interfaces 570 and 580 are similar to interfaces 550 and 560.

CSF 501 retrieves information regarding service offerings and service instances contained in a retrieved service descriptor from business support services (BSS) 507. The information in BSS 507 allows for generic descriptions of resources contained in a service descriptor to be expanded to full detail. CSF 501 retrieves information regarding the mapping of generic descriptions of resources contained in a service descriptor to cloud resources via web delivery platform (WDP) 508. It is important to note that while FIG. 5 shows separate data storages such as RAM 505, ECW 506, BSS 507 and WDP 508, in some embodiments the information contained in these data storages may be combined into a single data storage entity. In other embodiments, the information contained in the above-described data storages may be further divided into various sub-storage entities.

In some embodiments, a cloud service is packaged into an archive as a service descriptor. The service descriptor contains a META-INF folder that includes a manifest file service-.xml, and resources such as icons and scripts. The manifest describes models of the service. Any required resources are packaged in the service descriptor and referenced in the appropriate model in the manifest, such as service.xml.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but are not limited to, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-5, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of embodiments of the invention, for example, as depicted in FIGS. 1-5, can also include, as described herein, providing a system, wherein the system includes distinct modules (e.g., modules comprising software, hardware or software and hardware).

Figure 6:
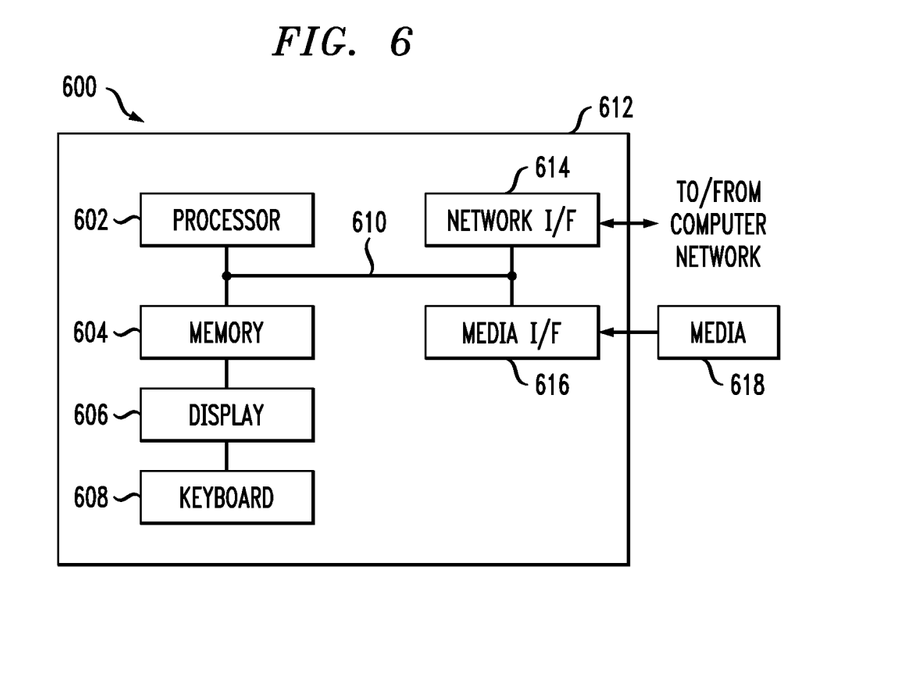
FIG. 6 illustrates a computing device in accordance with which one or more components/steps of techniques of the invention may be implemented, according to an embodiment of the invention.

One or more embodiments can make use of software running on a general purpose computer or workstation. With reference to FIG. 6, such an implementation 600 may employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 602, memory 604, and input/output interface such as a display 606 and keyboard 608 can be interconnected, for example, via bus 610 as part of data processing unit 612. Suitable interconnections, for example, via bus 610, can also be provided to a network interface 614, such as a network card, which can be provided to interface with a computer network, and to a media interface 616, such as a diskette or CD-ROM drive, which can be provided to interface with media 618.

A data processing system suitable for storing and/or executing program code can include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 608 for making data entries; display 606 for viewing data; a pointing device for selecting data; and the like) can be coupled to the system either directly (such as via bus 610) or through intervening I/O controllers (omitted for clarity).

Network adapters such as a network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 612 as shown in FIG. 6) running a server program. It will be understood that such a physical server may or may not include a display and keyboard. Further, it is to be understood that components may be implemented on one server or on more than one server.

Figure 7:
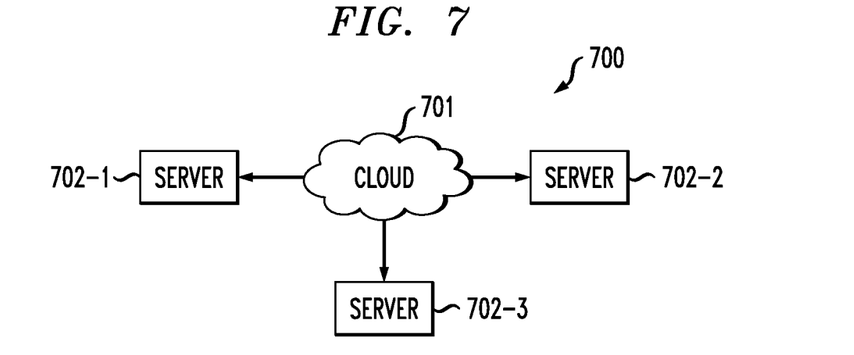
FIG. 7 illustrates cloud architecture, according to an embodiment of the invention.

FIG. 7 illustrates cloud architecture 700. A cloud 701 is shown, connected with servers 702-1, 702-2 and 702-3. Each server may include one or more of the implementations 600 of a computer or workstation as shown in FIG. 6. Servers 702-1, 702-2 and 702-3 provide various functionality for or in conjunction with the cloud 701, such as storage, application processing, management of service instances, etc.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system, comprising:
    a given cloud services environment comprising one or more clouds; and
    a cloud services framework configured to:
        register one or more service offerings from a plurality of independent software vendors for delivery of one or more service instances via said one or more clouds of the given cloud services environment, each of the one or more service offerings being described by at least one service descriptor;
        manage lifecycles of one or more service instances instantiated on said one or more clouds of the given cloud services environment, each of the one or more service instances being obtained from at least one of the one or more registered service offerings;
        provide one or more service support utilities for the one or more service instances instantiated on said one or more clouds of the given cloud services environment, each of the one or more service support utilities being customized by at least one service descriptor; and
        unregister one or more service offerings accessible via said one or more clouds of the given cloud services environment;
    wherein a service comprises at least one component and a service descriptor comprises one or more models.

2. The system of claim 1, wherein each of the one or more models of the service descriptor comprises at least one of:
    an information model that provides identifying information for at least one described service;
    a structural model that describes one or more components of at least one described service;
    an operational model that describes a procedure for obtaining at least one service instance of at least one described service;
    a data model that conveys data items between at least one service offering and at least one service instance of at least one described service;

an interaction model that describes a front end user experience at one or more stages in a lifecycle of at least one service instance;
a service-level agreement model that allows specification of at least one service quality guarantee agreed to by at least one service offering;
a licensing model;
a security model;
a billing model; and
a cloud concerns model.

3. The system of claim 2, wherein at least one of the one or more components described by the structural model is managed internally to a given one of said one or more clouds of the given cloud services environment.

4. The system of claim 2, wherein at least one of the one or more components described by the structural model is managed externally to a given one of said one or more clouds of the given cloud services environment.

5. The system of claim 2, wherein the procedure given by the operational model comprises one of: creating a service instance of the described service, becoming an additional tenant on an existing multi-tenant service instance, and connecting to a singleton service instance.

6. The system of claim 2, wherein the interaction model comprises at least one of:
a generation model which generates at least one end-user interface from available details in at least one service descriptor;
a redirection model which redirects at least one end-user interaction to an off-cloud user interface; and
an extension model which defines at least on end-user interaction model in terms of one or more extension points for a given user interface.

7. The system of claim 2, wherein the service-level agreement model includes at least one of a custom defined service quality level and a well-known service quality level.

8. The system of claim 1, wherein a given service descriptor applies to a single cloud.

9. The system of claim 1, wherein a given service descriptor applies to multiple clouds.

10. The system of claim 1, wherein a given service is one of a cloud service, infrastructure as a service, platform as a service and software as a service.

11. A method, comprising:
registering, using a cloud services framework associated with a given cloud services environment comprising one or more clouds, one or more service offerings from a plurality of independent software vendors for delivery of one or more service instances via said one or more clouds of the given cloud services environment, each of the one or more service offerings being described by at least one service descriptor;
displaying a catalog of available registered service offerings;
managing lifecycles of one or more service instances instantiated on said one or more clouds of the given cloud services environment, each of the one or more service instances being obtained from at least one of the one or more registered service offerings;
providing one or more service support utilities for the one or more service instances instantiated on said one or more clouds of the given cloud services environment, each of the one or more service support utilities being customized by at least one service descriptor;
unregistering one or more of the available registered service offerings accessible via said one or more clouds of the given cloud services environment;
wherein a service comprises at least one component and a service descriptor comprises one or more models.

12. The method of claim 11, wherein managing lifecycles of one or more services instances instantiated on said one or more clouds of the given cloud services environment comprises:
obtaining one or more service instances;
reading state information from at least one of the one or more service instances;
discarding a given one of the one or more service instances.

13. The method of claim 12, wherein obtaining one or more service instances comprises one of creating a new service instance, adding a new tenant to an existing multi-tenant service instance, and connecting to a singleton service instance.

14. The method of claim 12, wherein discarding the given service instance comprises one of destroying the given service instance, removing a tenant from the given service instance, and disconnecting from the given service instance.

15. The method of claim 11, wherein a given service is one of a cloud service, infrastructure as a service, platform as a service and software as a service.

16. A computer-readable storage medium comprising executable program code for implementing the method of claim 11.

17. An apparatus, comprising:
a memory; and
a processor device operatively coupled to the memory and configured to:
register, using a cloud services framework associated with a given cloud services environment comprising one or more clouds, one or more service offerings from a plurality of independent software vendors for delivery of one or more service instances via said one or more clouds of the given cloud services environment, each of the one or more service offerings being described by at least one service descriptor;
display a catalog of available registered service offerings;
manage lifecycles of one or more services instances instantiated on said one or more clouds of the given cloud services environment, each of the one or more service instances being obtained from at least one of the one or more registered service offerings;
provide one or more service support utilities for the one or more service instances instantiated on said one or more clouds of the given cloud services environment, each of the one or more service support utilities being customized by at least one service descriptor;
unregister one or more of the available registered service offerings accessible via said one or more clouds of the given cloud services environment;
wherein a service comprises at least one component and a service descriptor comprises one or more models.

* * * * *